(12) United States Patent
Hsu et al.

(10) Patent No.: US 10,633,264 B2
(45) Date of Patent: Apr. 28, 2020

(54) PURIFYING DEVICE

(71) Applicants: Industrial Technology Research Institute, Hsinchu (TW); Changhua Christian Hospital, Changhua (TW)

(72) Inventors: Chen-Peng Hsu, Hsinchu (TW); Cheng-Da Shaw, Taipei (TW); Chien-Chun Lu, New Taipei (TW); Yi-Keng Fu, Hsinchu County (TW); Hung-Ming Wu, Taichung (TW)

(73) Assignees: Industrial Technology Research Institute, Hsinchu (TW); Changhua Christian Hospital, Changhua (TW)

( * ) Notice: Subject to any disclaimer, the term of this patent is extended or adjusted under 35 U.S.C. 154(b) by 45 days.

(21) Appl. No.: 15/869,101

(22) Filed: Jan. 12, 2018

(65) Prior Publication Data
US 2018/0194645 A1 Jul. 12, 2018

Related U.S. Application Data

(60) Provisional application No. 62/445,701, filed on Jan. 12, 2017.

(30) Foreign Application Priority Data

Oct. 20, 2017 (TW) .............................. 106136256 A

(51) Int. Cl.
*C02F 1/32* (2006.01)
*C02F 1/00* (2006.01)

(52) U.S. Cl.
CPC ................ *C02F 1/32* (2013.01); *C02F 1/002* (2013.01); *C02F 2201/326* (2013.01); *C02F 2303/04* (2013.01); *C02F 2307/02* (2013.01)

(58) Field of Classification Search
CPC ...... B01D 2311/2603; B01D 2325/022; B01D 69/02; B01D 69/12; C08F 6/04
See application file for complete search history.

(56) References Cited

U.S. PATENT DOCUMENTS

| 4,755,292 A | 7/1988 | Merriam | |
|---|---|---|---|
| 6,514,405 B1 * | 2/2003 | Lifschitz | ................. C02F 1/325 210/143 |

(Continued)

FOREIGN PATENT DOCUMENTS

| CN | 201351123 | 11/2009 |
|---|---|---|
| CN | 101703356 | 5/2010 |

(Continued)

OTHER PUBLICATIONS

"Office Action of Taiwan Counterpart Application", dated May 22, 2018, p. 1-p. 4.

*Primary Examiner* — Dirk R Bass
(74) *Attorney, Agent, or Firm* — JCIPRNET

(57) ABSTRACT

A purifying device including a container, at least one cover, a sensing assembly and an ultraviolet source is provided. The container has a containing space, wherein the containing space is adapted to contain a liquid. The cover is adapted to be connected to the container to cover the containing space. The sensing assembly is disposed on the cover, wherein the sensing assembly is adapted to sense a usage state of the cover. The ultraviolet source is disposed on the cover and is adapted to generate an ultraviolet emitted to outside of the cover, wherein the ultraviolet source is turned on or turned off according the usage state of the cover.

15 Claims, 12 Drawing Sheets

(56) References Cited

U.S. PATENT DOCUMENTS

| | | | |
|---|---|---|---|
| 7,713,483 B2 | 5/2010 | Maiden | |
| 8,816,300 B1 | 8/2014 | Walker et al. | |
| 8,975,596 B1 * | 3/2015 | Matthews | C02F 1/325 250/432 R |
| 9,212,067 B2 | 12/2015 | Gellibolian et al. | |
| 2005/0189290 A1 * | 9/2005 | Maiden | B01D 29/085 210/473 |
| 2006/0163169 A1 * | 7/2006 | Eckhardt | C02F 1/002 210/748.11 |
| 2009/0126145 A1 * | 5/2009 | D'Agostino | A47L 5/28 15/339 |
| 2011/0278467 A1 * | 11/2011 | Tanaka | C02F 1/325 250/372 |
| 2017/0057841 A1 | 3/2017 | Blood et al. | |

FOREIGN PATENT DOCUMENTS

| | | |
|---|---|---|
| CN | 102070257 | 5/2011 |
| CN | 202688035 | 1/2013 |
| CN | 202945117 | 5/2013 |
| CN | 203440122 | 2/2014 |
| CN | 103720192 | 4/2014 |
| CN | 106073132 | 11/2016 |
| CN | 106333581 | 1/2017 |
| KR | 20130106994 | 10/2013 |
| KR | 20130106995 | 10/2013 |
| KR | 20130124086 | 11/2013 |
| TW | 201300325 | 1/2013 |
| TW | M449028 | 3/2013 |
| WO | 2005090241 | 9/2005 |

* cited by examiner

PURIFYING DEVICE

CROSS-REFERENCE TO RELATED APPLICATION

This application claims the priority benefits of U.S. provisional application Ser. No. 62/445,701, filed on Jan. 12, 2017 and Taiwan application serial no. 106136256, filed on Oct. 20, 2017. The entirety of each of the above-mentioned patent applications is hereby incorporated by reference herein and made a part of this specification.

TECHNICAL FIELD

The disclosure is related to a purifying device.

BACKGROUND

In our daily lives, drinking water is essential for human to maintain function of body. However, after the drinking water is in contact with air for a period of time, bacteria in the drinking water is contaminated and increased. Therefore, when user drinks the drinking water with increased bacteria, discomfort can easily occur to the user.

A known drinking water purifying method is to add an ultraviolet source at a cover of a cup or a bottle. When the cover of cup or bottle is covered on a water bottle or a water cup, the ultraviolet source generates an ultraviolet to the drinking water in the water bottle or water cup to kill bacteria. However, when the cover of cup or bottle is not covered on the water bottle or water cup, the ultraviolet generated by the ultraviolet source is likely to be emitted to human body and cause harm. In addition, the cover of cup or bottle provided with the ultraviolet source is only adapted for the water bottle or water cup with corresponding size but not adapted for the water bottle or water cup of various sizes.

SUMMARY

The disclosure provides a purifying device, which can avoid an ultraviolet generated by an ultraviolet source to be emitted to human body.

The disclosure provides a purifying device adapted to containers of various sizes.

The purifying device of the disclosure includes a container, at least one cover, a sensing assembly and an ultraviolet source. The container has a containing space, wherein the containing space is adapted to contain a liquid. The cover is adapted to be connected to the container to cover the containing space. The sensing assembly is disposed on the cover, wherein the sensing assembly is adapted to sense a usage state of the cover. The ultraviolet source is disposed on the cover and adapted to generate an ultraviolet emitted to outside of the cover, wherein the ultraviolet source is turned on or turned off according to the usage state of the cover.

A purifying device of the disclosure includes a cover, an ultraviolet source and a supporting structure. The cover is adapted to be connected a container to cover a containing space of the container. The containing space is adapted to contain a liquid. The ultraviolet source is disposed on the cover and adapted to generate an ultraviolet emitted to outside of the cover. The supporting structure is connected to the cover and adapted to lean against a top end of the container to support the cover to be above the container.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1A:
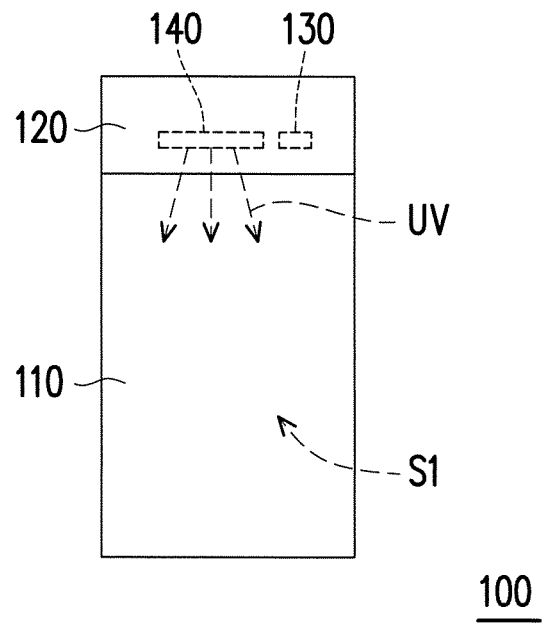
FIG. 1A illustrates a schematic view of a purifying device according to an embodiment of the disclosure.
Figure 1B:
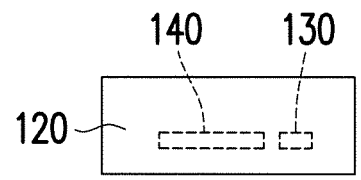
FIG. 1B illustrates a cover of FIG. 1A not covered on the container.

FIG. 1A illustrates a schematic view of a purifying device according to an embodiment of the disclosure. FIG. 1B illustrates a cover of FIG. 1A not covered on the container. Referring to FIG. 1A and FIG. 1B, in the embodiment, a purifying device 100 includes a container 110, a cover 120, a sensing assembly 130 and an ultraviolet source 140. The container 110 is, for example, a water bottle or a water cup and has a containing space S1. The containing space S1 is adapted to contain a liquid; the liquid is, for example, drinking water. The cover 120 is adapted to be connected to the container 110 to cover the containing space S1.

The sensing assembly 130 is disposed on the cover 120 and adapted to sense a usage state of the cover 120, that is, whether the cover 120 is covered on the container 110. The ultraviolet source 140 is, for example, a far-ultraviolet (UVC) source disposed on the cover 120 and adapted to generate an ultraviolet emitted to outside of the cover 120. The ultraviolet source 140 is turned on or turned off according to the usage state of the cover 120. Specifically, when the sensing assembly 130 senses that the cover 120 is covered on the container 110 as shown in FIG. 1A, the ultraviolet source 140 generates the ultraviolet accordingly to kill bacteria in the liquid in the container 110. On the contrary, when the sensing assembly 130 senses that the cover 120 is not covered on the container 110 as shown in FIG. 1B, the ultraviolet source 140 does not generate the ultraviolet accordingly to avoid that the ultraviolet generated by the ultraviolet source 140 is emitted to human body.

In the embodiment, the material of the inner wall of the container 110 is, for example, stainless steel having good reflectivity to improve the transmitting efficiency of the ultraviolet in the container 110. In addition, the ultraviolet source 140 in the embodiment is, for example, a light emitting diode light source and has high directivity, which can efficiently enable the ultraviolet to be directly emitted to the liquid in the container 110.

Figure 2A:
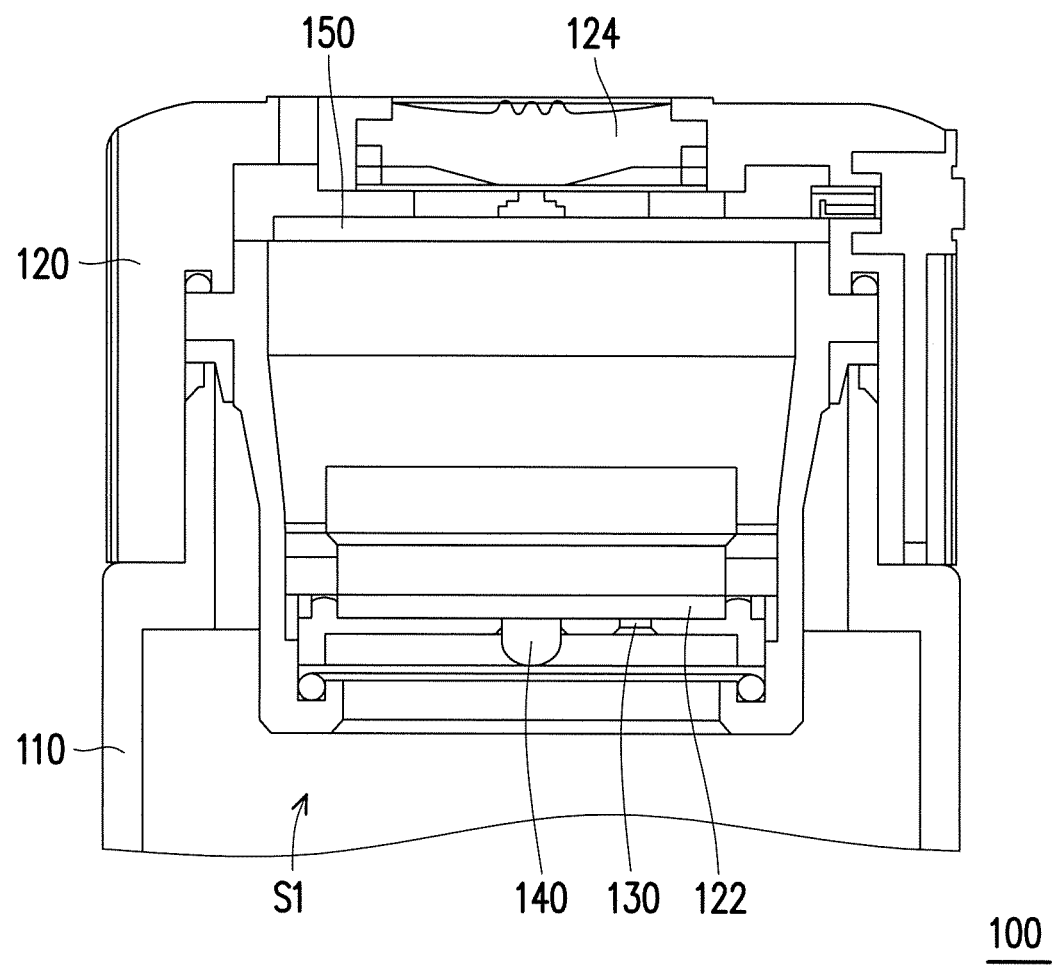
FIG. 2A illustrates a partial structure of the purifying device of FIG. 1.
Figure 2B:
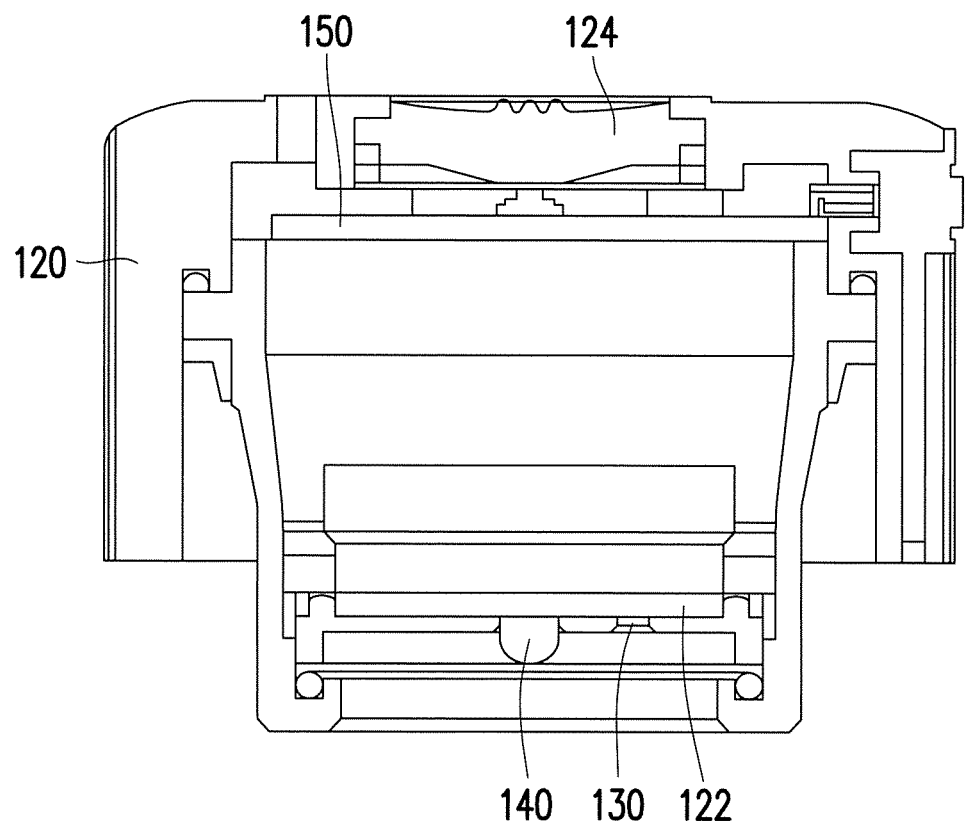
FIG. 2B illustrates a cover of FIG. 2A not covered on the container.

The container 110, the cover 120, the sensing assembly 130 and the ultraviolet source 140 illustrated in FIG. 1A and FIG. 1B are for schematic purpose only. The following paragraphs describe the specific configuration and operating method of the purifying device 100 in the embodiment in details. FIG. 2A illustrates a partial structure of the purifying device of FIG. 1. FIG. 2B illustrates a cover of FIG. 2A not covered on the container. Referring to FIG. 2A and FIG. 2B, a purifying device 100 in the embodiment includes a control unit 150, and the control unit 150 is, for example a control board which is disposed on the cover 220 and coupled to the sensing assembly 130 and the ultraviolet source 140. The sensing assembly 130 is, for example, a light sensing element. The sensing assembly 130 and the ultraviolet source 140 are configured on a substrate 122 in the cover 120.

When the cover 120 is covered on the container 110 as shown in FIG. 2A such that the intensity of light entering from outside of the cover 120 into the cover 120 is smaller than a threshold value, the control unit 150 determines that the usage state of the cover 120 is a covering state and controls the ultraviolet source 140 to be turned on. On the contrary, when the cover 120 is separated from the container 110 as shown in FIG. 2B such that the intensity of light (i.e., light in the ambient environment) entering from outside of the cover 120 into the cover 120 is greater than or equal to the threshold value, the control unit 150 determines that the usage state of the cover 120 is a non-covering state and controls the ultraviolet source 140 to be turned off. The disclosure provides no limitation to the amount of threshold value, which may be determined depending on the need of design.

In the embodiment, the outer side of the cover 120 has an activating button 124. The activating button 124 is connected to the control board (i.e., control unit 150). The user may press the activating button 124 to activate the control board (i.e., control unit 150), the sensing assembly 130 and the ultraviolet source 140 to enable them to perform the sensing function. When the user is to stop the sensing function, the activating button 124 may be pressed again to turn the function off.

Figure 3A:
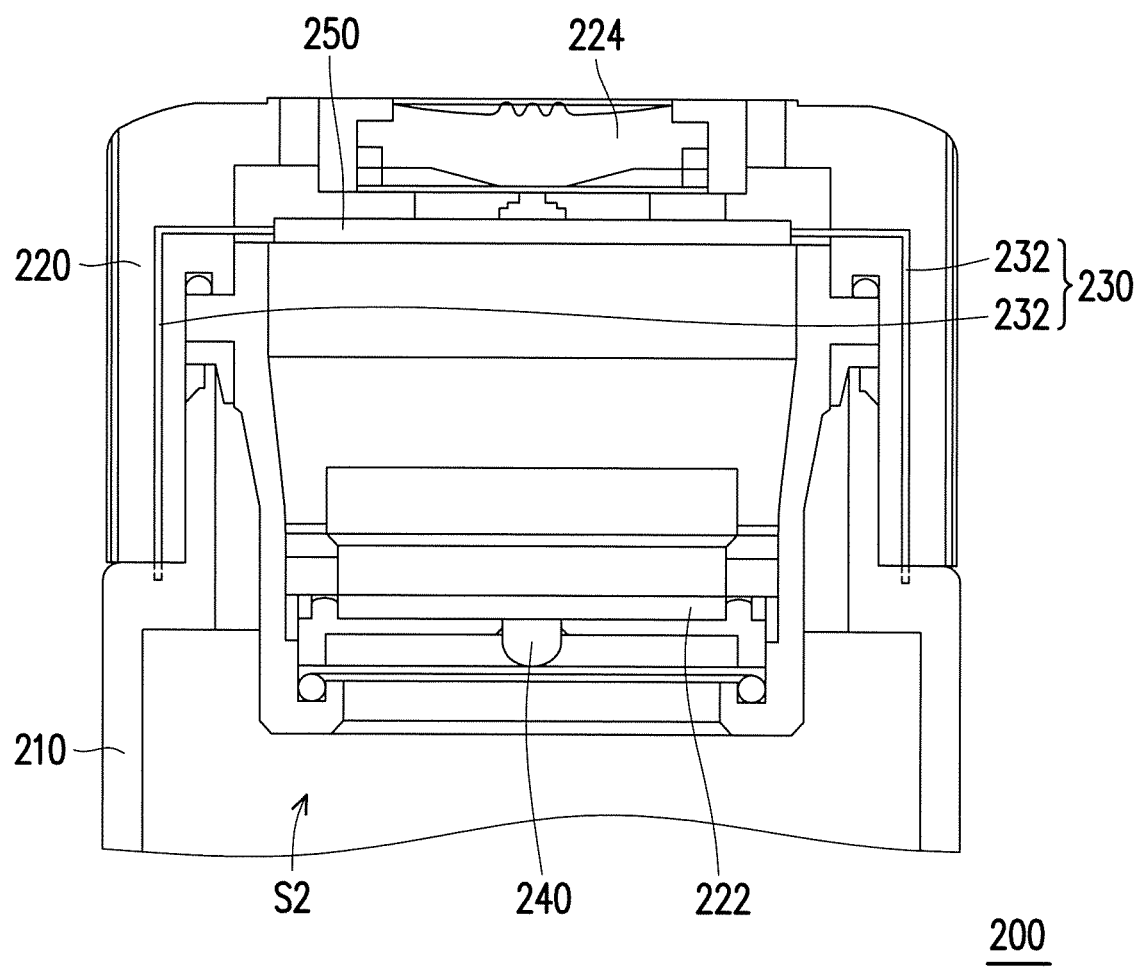
FIG. 3A illustrates a partial structure of a purifying device according to another embodiment of the disclosure.
Figure 3B:
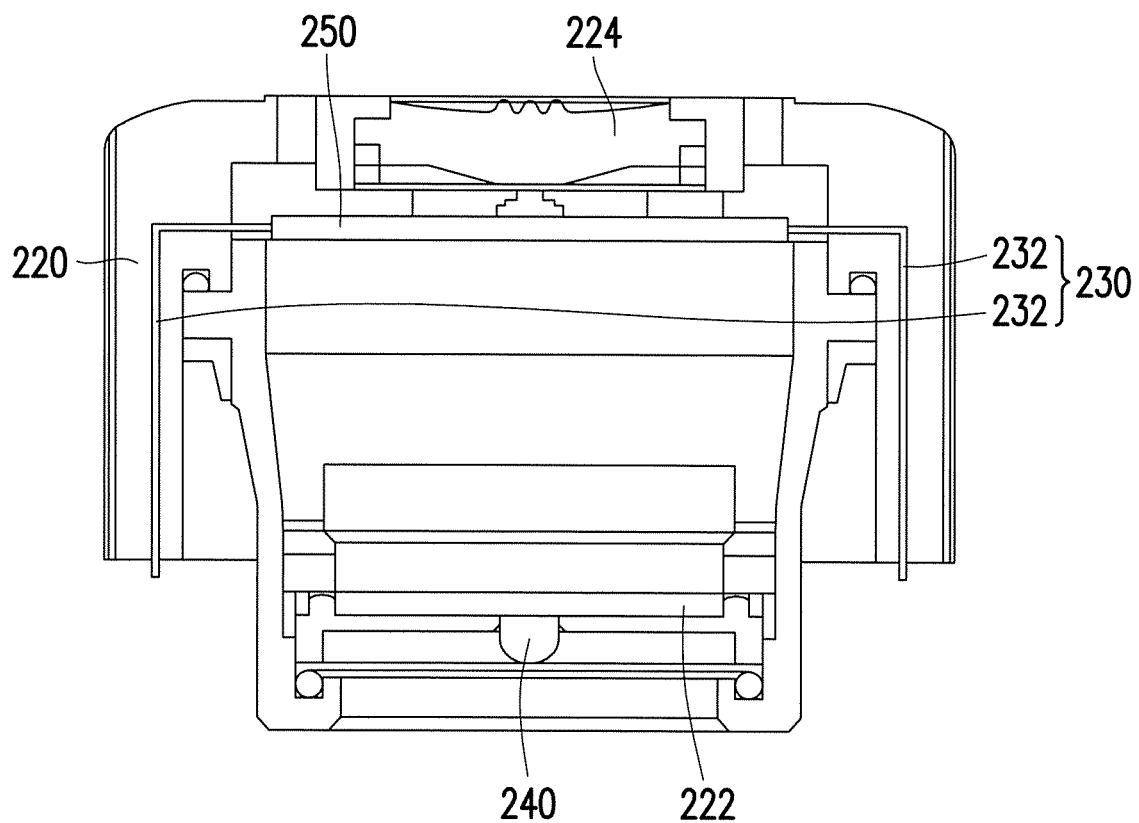
FIG. 3B illustrates a cover of FIG. 3A not covered on the container.

FIG. 3A illustrates a partial structure of a purifying device according to another embodiment of the disclosure. FIG. 3B illustrates a cover of FIG. 3A not covered on the container. In a purifying device 200 illustrated in FIG. 3A and FIG. 3B, the configuration and operating method of a container 210, a cover 220, a substrate 222, an ultraviolet source 240, an activating button 224 and a containing space S2 are similar to the configuration and operating method of the container 110, the cover 120, the substrate 122, the ultraviolet source 140, the activating button 124 and the containing space S1 in FIG. 2A and FIG. 2B, and thus no further descriptions are incorporated herein. The difference between the embodiment shown in FIG. 3A and FIG. 3B and the embodiment shown in FIG. 2A and FIG. 2B is that, the material of the container 210 includes a conductive material; the sensing assembly 230 includes two conductive probes 232. When the cover 220 is covered on the container 210 as shown in FIG. 3A such that the two conductive probes 232 are in contact with the container 210 and electrically connected to each other via the container 210, the usage state of the cover 220 is the covering state, and the control unit 250 controls the ultraviolet source 240 to be turned on. On the contrary, when the cover 220 is separated from the container 210 as shown in FIG. 3B such that the two conductive probes 232 are not in contact with the container 210, the usage state of the cover 220 is the non-covering state, and the ultraviolet source 240 is turned off.

Figure 4A:
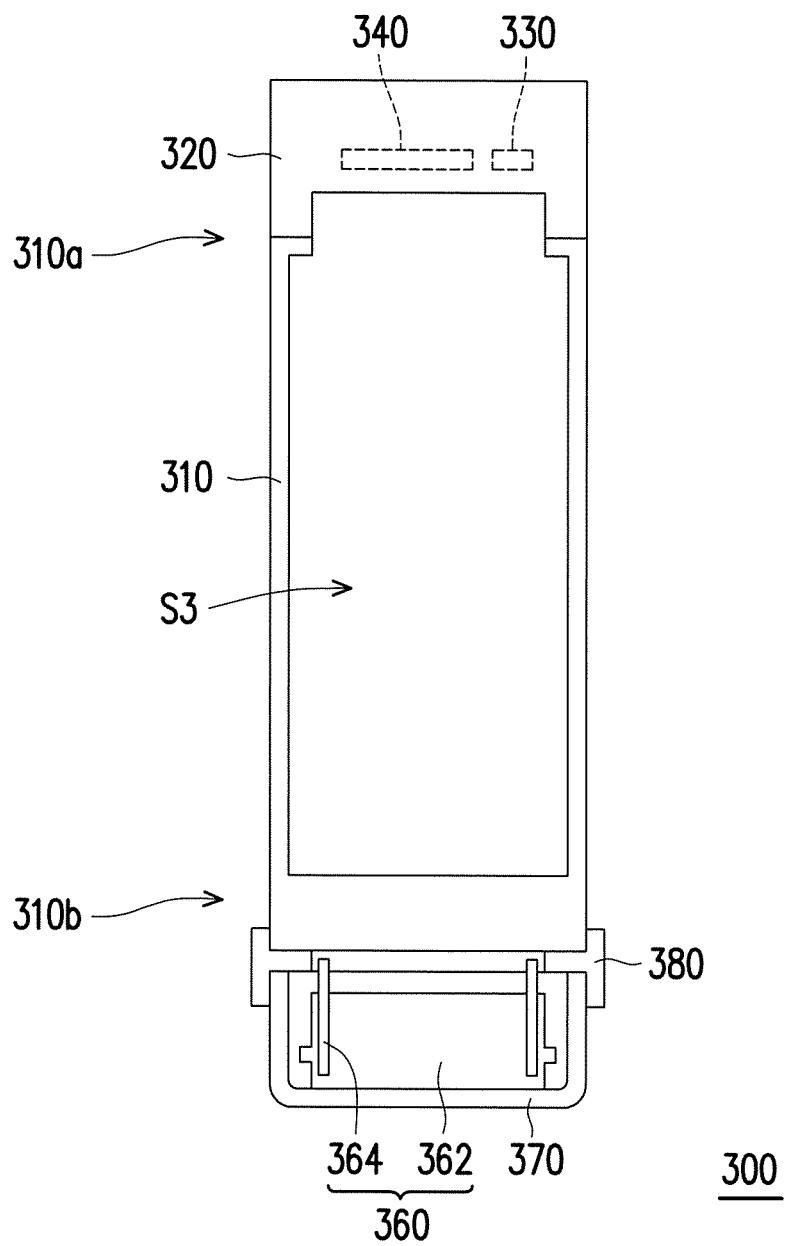
FIG. 4A illustrates a schematic view of a partial structure of a purifying device according to another embodiment of the disclosure.
Figure 4B:
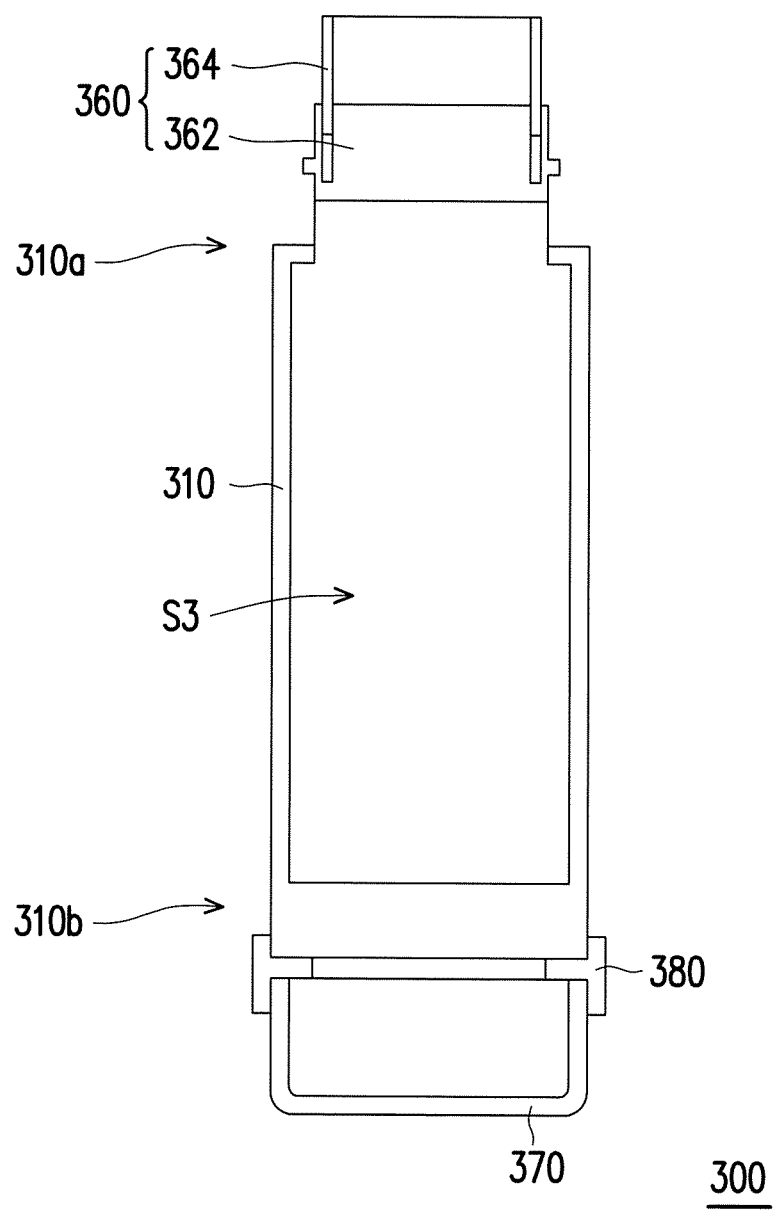
FIG. 4B illustrates an open end of a liquid filtering assembly covered on the container in FIG. 4A.

FIG. 4A illustrates a schematic view of a partial structure of a purifying device according to another embodiment of the disclosure. FIG. 4B illustrates an open end of a liquid filtering assembly covered on the container in FIG. 4A. In FIG. 4A and FIG. 4B, the configuration and operating method of a container 310, a cover 320, a sensing assembly 330, an ultraviolet source 340 and a containing space S3 are the similar to the configuration and operating method of the container 110, the cover 120, the sensing assembly 130, the ultraviolet source 140 and containing space S1 in FIG. 1A and FIG. 1B, and thus no further descriptions are incorporated herein. The difference between the embodiment shown in FIG. 4A and FIG. 4B and the embodiment shown in FIG. 1A and FIG. 1B is that a purifying device 300 further includes a liquid filtering assembly 360. The container 310 has an open end 310a and a close end 310b opposite to each other. The cover 320 is adapted to be connected to the open end 310a as shown in FIG. 4A to cover the containing space S3. When the liquid filtering assembly 360 is not in use, the liquid filtering assembly 360 is detachably disposed at the close end 310b. When the liquid filtering assembly 360 is to be used, the cover 320 may be separated from the open end 310a first, and the liquid filtering assembly 360 is detachably disposed at the open end 310a so that the liquid (e.g., drinking water) enters the containing space S3 of the container 310 after passing through the liquid filtering assembly 360.

In the embodiment, the purifying device 300 includes an appearance element 370 and a connector 380. The connector 380 is detachably connected to the close end 310b via screwing, locking or other suitable means. The appearance element 370 is detachably disposed on the connector 380 via screwing, locking or other suitable means and adapted to accommodate the liquid filtering assembly 360 as shown in FIG. 4A.

Specifically, the liquid filtering assembly 360 includes a filter cartridge 362 and a liquid guiding element 364. When the liquid filtering assembly 360 is disposed at the close end 310b as shown in FIG. 4A, the liquid guiding element 364 surrounds the filter cartridge 362 so that the liquid filtering assembly 360 has smaller volume to be accommodated in the appearance element 370. When the liquid filtering assembly 360 is disposed at the open end 310a, the liquid guiding element 364 moves upward relative to the filter cartridge 362 as shown in FIG. 4B to guide the liquid to flow toward the filter cartridge 362.

Figure 5A:
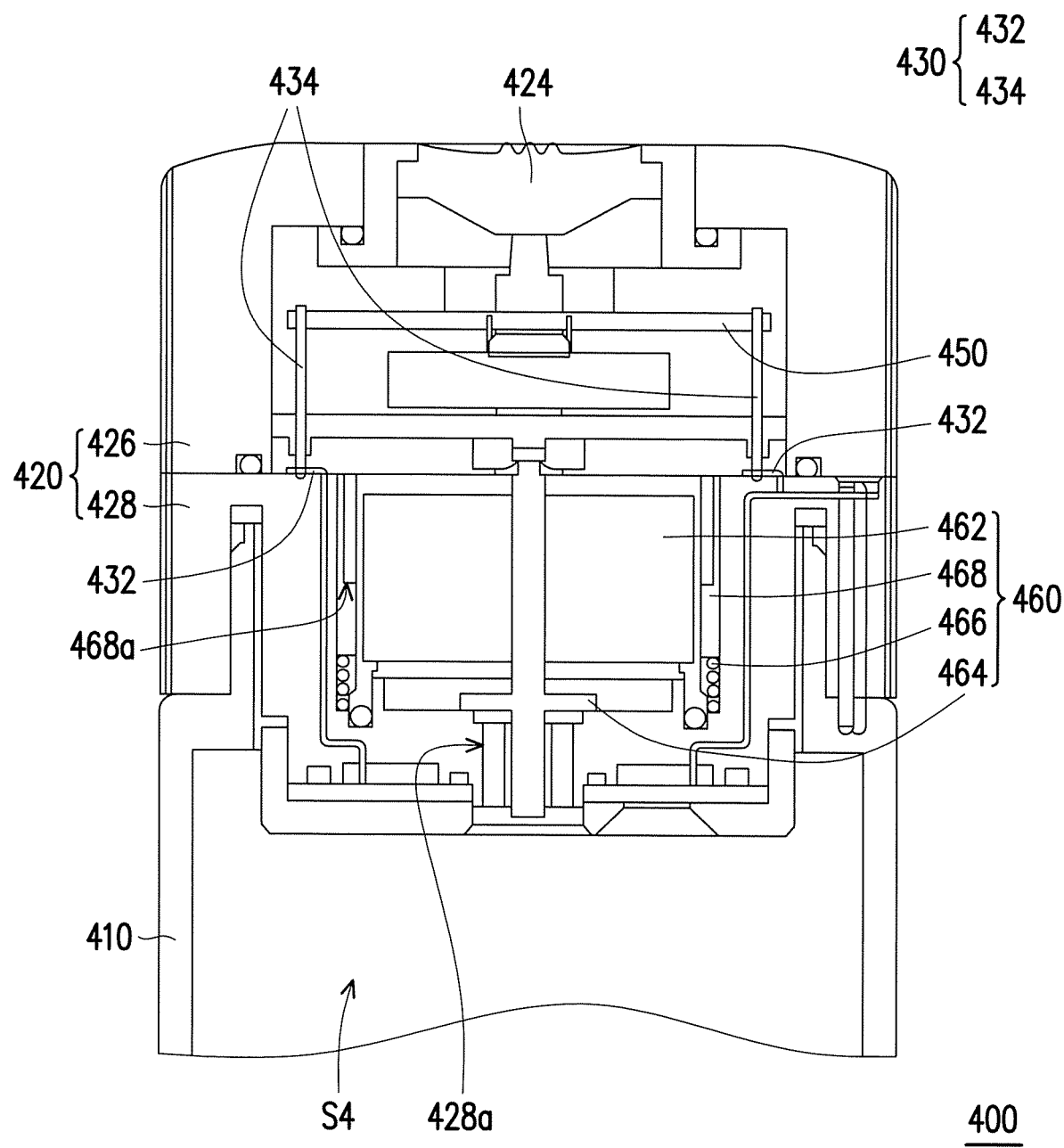
FIG. 5A illustrates a partial structure of a purifying device according to another embodiment of the disclosure.
Figure 5B:
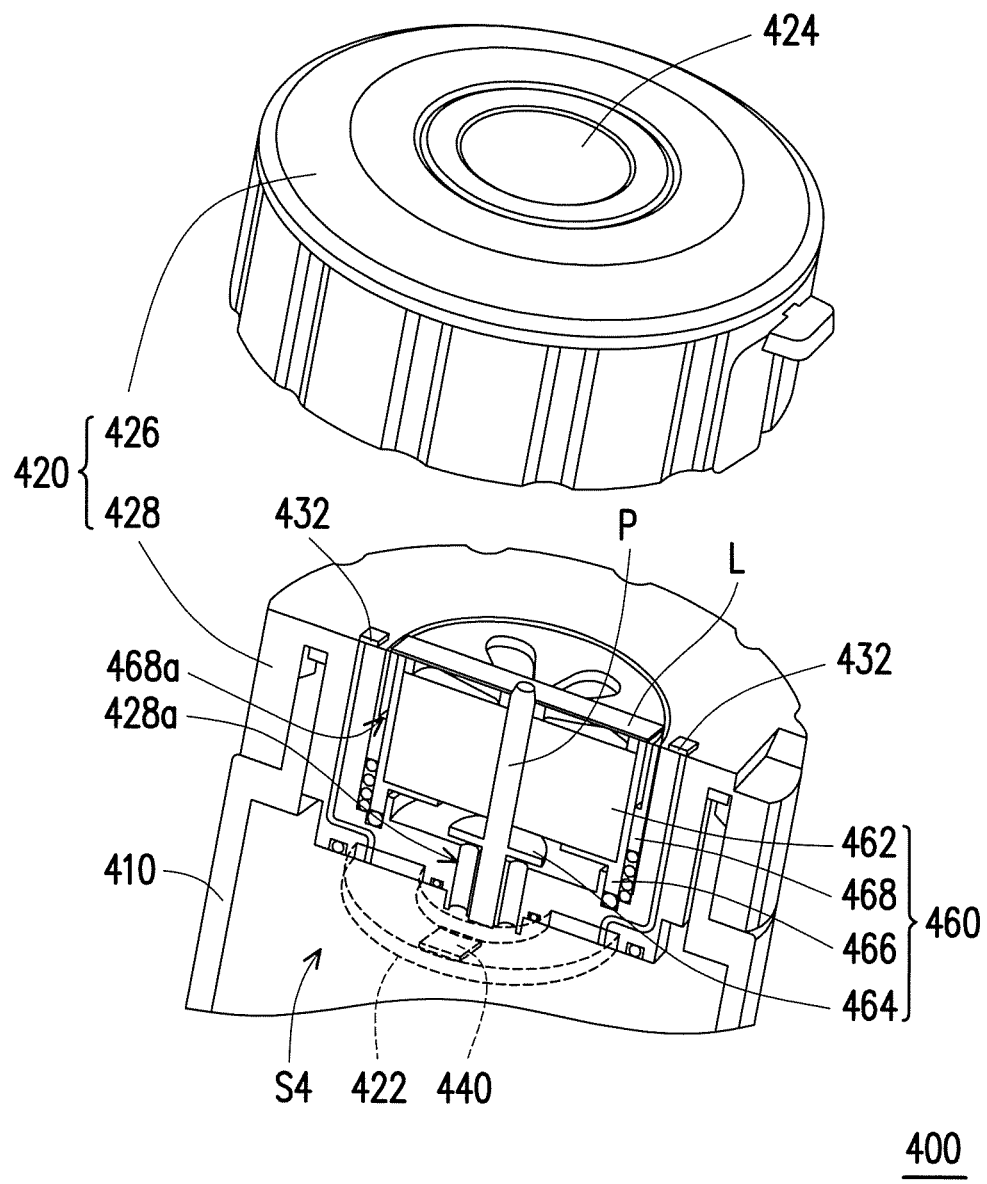
FIG. 5B is a 3D explosive view of the purifying device in FIG. 5A.
Figure 5C:
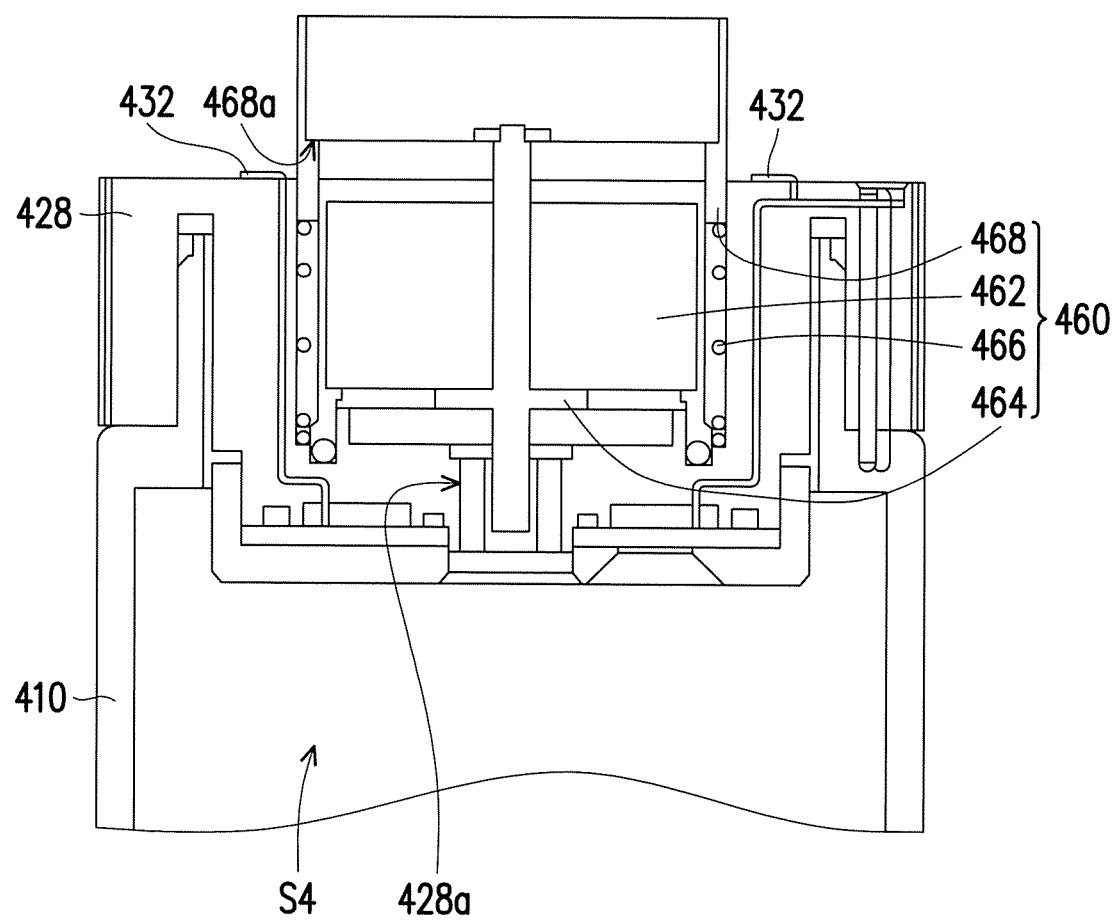
FIG. 5C illustrates a cover of FIG. 5A not covered on the container.

FIG. 5A illustrates a partial structure of a purifying device according to another embodiment of the disclosure. FIG. 5B is a 3D explosive view of the purifying device in FIG. 5A. FIG. 5C illustrates a cover of FIG. 5A not covered on the container. In a purifying device 400 illustrated in FIG. 5A to FIG. 5C, the configuration and operating method of a container 410, an activating button 424, an ultraviolet source 440 and a containing space S4 are similar to the configuration and operating method of the container 110, the activating button 124, the ultraviolet source 140 and the containing space S1 in FIG. 2A and FIG. 2B, and thus no further descriptions are incorporated herein. The difference between the embodiment shown in FIG. 5A to FIG. 5C and the embodiment shown in FIG. 2A and FIG. 2B is that the purifying device 400 includes a liquid filtering assembly 460; a cover 420 includes an outer cover 426 and an inner cover 428; the inner cover 428 is detachably disposed on the container 410; the liquid filtering assembly 460 and the ultraviolet source 440 are disposed on the inner cover 428; and the outer cover 426 is adapted to cover the inner cover 428 as shown in FIG. 5A.

Specifically, the liquid filtering assembly 460 includes a filter cartridge 462, a covering element 464, an elastic element 466 and a liquid guiding element 468. The liquid guiding element 468 surrounds the filter cartridge 462; the elastic element 466 is, for example, a compressing spring and surrounds the filter cartridge 462. An upper end of the elastic element 466 abuts against a lower end of the liquid guiding element 468, and the lower end of the elastic element 466 abuts against the inner cover 428. That is to say, the elastic element 466 is connected between the liquid guiding element 468 and the inner cover 428. When the outer cover 426 covers the inner cover 428 as shown in FIG. 5A, the outer cover 426 resists the elastic force of the elastic element 466 and presses the liquid guiding element 468 down to prevent the liquid guiding element 468 from moving upward relative to the filter cartridge 462. When the outer cover 426 is separated from the inner cover 428, the liquid guiding element 468 moves upward relative to the filter cartridge 462 as shown in FIG. 5C via the elastic force of the elastic element 466 to guide the liquid to flow toward the filter cartridge 462.

Furthermore, the inner cover 428 of the embodiment has at least one opening 428a (a plurality of openings are shown). The opening 428a is disposed between the filter cartridge 462 and the containing space S4 of the container 410. The covering element 464 is, for example, integratedly connected to a bottom end of a pillar P, and a top end of the pillar P is connected to a cross bar L. When the outer cover 426 covers the inner cover 428 as shown in FIG. 5A, the covering element 464 covers the opening 428a to block the liquid in the container 410 from returning to the filter cartridge 462. When the outer cover 426 is separated from the inner cover 428, the liquid guiding element 468 moves upward relative to the filter cartridge 462 as shown in FIG. 5C via the elastic force of the elastic element 466. At this time, the cross bar L is pushed upward by a pushing portion 468a of the liquid guiding element 468 such that the covering element 464 is driven away from the opening 428a. In other words, the covering element 464 moves away from the opening 428a via the elastic force of the elastic element 466. In such state, after passing through the filter cartridge 462 vertically, the liquid can enter the container 410 via the opening 428a. In the embodiment, a substrate 422 of the ultraviolet source 440 is in a circular shape as shown in FIG. 5B so that the liquid can enter the container 410 through the center of the circular-shaped substrate 422 after passing through the opening 428a.

In the embodiment, the sensing assembly 430 includes two electrodes 432 and a conductive structure 434. The two electrodes 432 are disposed on the inner cover 428, and the conductive structure 434 is disposed on the outer cover 426 and connected to a control unit 450 in the outer cover 426. When the outer cover 426 covers the inner cover 428 as shown in FIG. 5A so that the conductive structure 434 is connected to the two electrodes 432, the usage state of the cover 420 is the covering state, and the control unit 450 is electrically connected to the two electrodes 432 via the conductive structure 434 to turn on the ultraviolet source 440. When the outer cover 426 is separated from the inner cover 428 such that the conductive structure 434 is not connected to the two electrodes 432, the usage state of the cover 420 is the non-covering state and the ultraviolet source 440 is turned off.

Figure 6A:
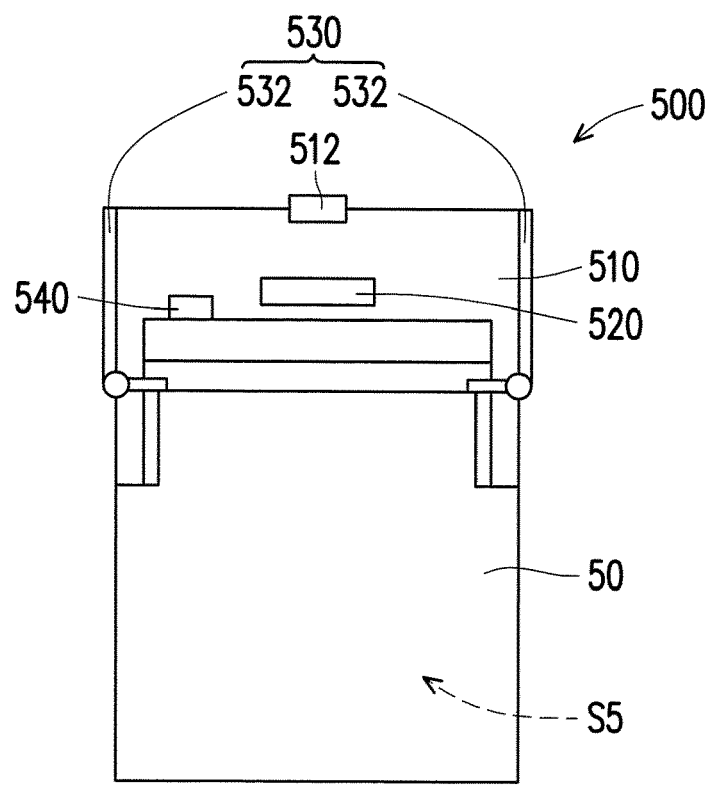
FIG. 6A illustrates a schematic view of a purifying device disposed on a container according to an embodiment of the disclosure.
Figure 6B:
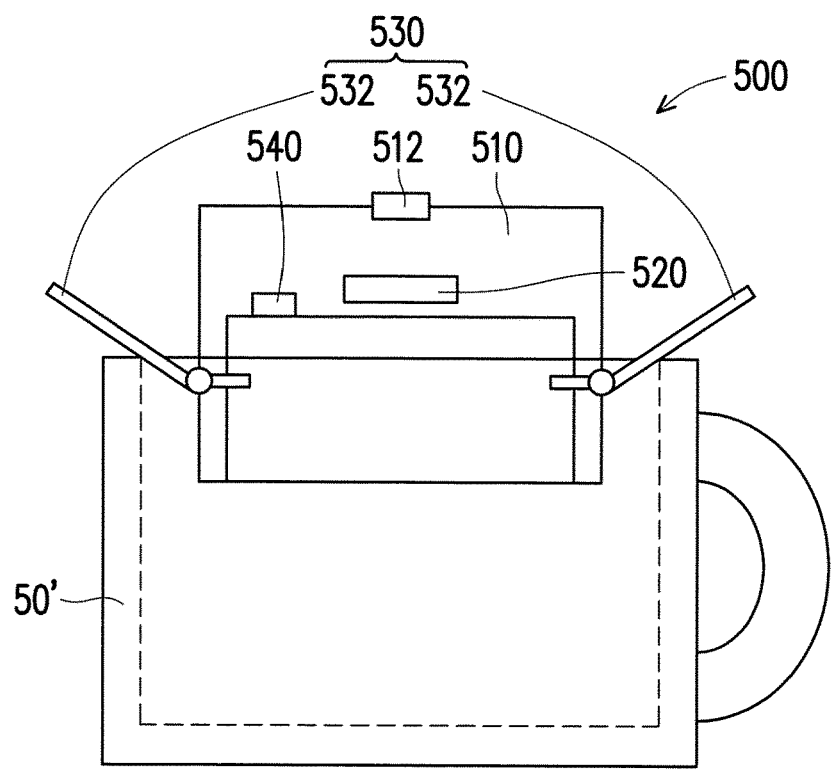
FIG. 6B illustrates the purifying device in FIG. 6A disposed on another container.

FIG. 6A illustrates a schematic view of a purifying device disposed on a container according to an embodiment of the disclosure. FIG. 6B illustrates the purifying device in FIG. 6A disposed on another container. Referring to FIG. 6A and FIG. 6B, a purifying device 500 of the embodiment includes a cover 510, an ultraviolet source 520 and a sensing assembly 540. The cover 510 is adapted to be connected to a container 50 to cover a containing space S5 of the container 50, and the containing space S5 is adapted to contain a liquid (e.g., drinking water). The ultraviolet source 520 is disposed on the cover 510 and adapted to generate an ultraviolet emitted to outside of the cover 510. The cover 510 is provided with an activating button 512. The configuration and operating method of the activating button 512, the ultraviolet source 520 and the sensing assembly 540 are similar to the configuration and operating method of the activating button, the ultraviolet source and the sensing assembly described in the previous embodiments, and thus no further descriptions are incorporated herein.

In the embodiment, the purifying device 500 further includes a supporting structure 530. The supporting structure 530 is connected to an edge of the cover 510. In FIG. 6A, the size of the container 50 matches the size of the cover 510; therefore, the cover 510 can directly lean against the top end of the container 50. As shown in FIG. 6B, with the design of the supporting structure 530, even if the size of a container 50' does not match the size of the cover 510, the supporting structure 530 can lean against the top end of the container 50' to support the cover 510 to be above the container 50' so that the cover 510 is adapted to containers of various sizes.

In the embodiment, the supporting structure 530 can be accommodated in the cover 510 and can be opened to cover the container 50'. Specifically, the supporting structure 530 is, for example, an elastic material and adapted to be attached to the cover 510 as shown in FIG. 6A or opened to be attached to the container 50' as shown in FIG. 6B. The supporting structure 530 is, for example, a circular shape and surrounds the cover 510. The circular-shaped supporting structure 530 can fully seal the top end of the container 50' to avoid that the ultraviolet generated by the ultraviolet source 520 to be emitted to the outer environment. In other embodiment, the supporting structure 530 may be a structure of other suitable forms; the disclosure provides no particular limitation thereto. In addition, the supporting structure 530 is, for example, detachably connected to the cover 510, and thus the user can detach the supporting structure 530 from the cover 510 depending on the need.

Figure 7:
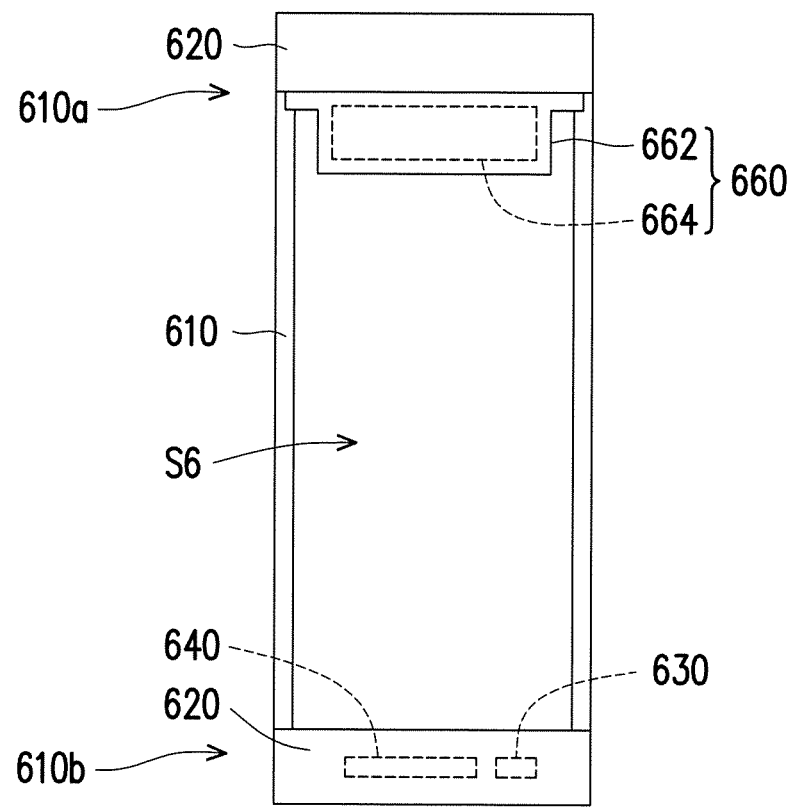
FIG. 7 is a schematic view illustrating a partial structure of a purifying device according to another embodiment of the disclosure.

FIG. 7 is a schematic view illustrating a partial structure of a purifying device according to another embodiment of the disclosure. In a purifying device 600 of the embodiment, the number of the cover 620 is two. A container 610 has a first open end 610a and a second open end 610b opposite to each other. The two covers 620 are respectively adapted to be connected to the first open end 610a and the second open end 610b to cover a containing space S6. A sensing assembly 630 and an ultraviolet source 640 are disposed on the cover 620 corresponding to the second open end 610b. The purifying device 600 further includes a liquid filtering assembly 660. The liquid filtering assembly 660 is detachably disposed at the first open end 610*a*. Specifically, the liquid filtering assembly 660 includes a filter cartridge base 662 and a filter cartridge 664. The filter cartridge base 662 is detachably disposed at the first open end 610*a* and accommodates the filter cartridge 664. The filter cartridge base 662 has an opening for accommodating the filter cartridge 664, and the liquid can enter the container 610 after flowing through the filter cartridge 664 via the opening. The filter cartridge 664 can be taken out from the filter cartridge base 662 for replacement.

In summary, in the purifying device of the disclosure, the cover is provided with the sensing assembly to sense whether the cover is covered on the container. When the sensing assembly senses that the cover is covered on the container, the ultraviolet source generates the ultraviolet accordingly to kill the bacteria in the liquid in the container. On the contrary, when the sensing assembly senses that the cover is not covered on the container, the ultraviolet source does not generate the ultraviolet accordingly to avoid that the ultraviolet generated by the ultraviolet source to be emitted to human body. Additionally, in the purifying device of the disclosure, the cover is provided with the supporting structure; therefore, even if the size of the container does not match the size of the cover, the cover can be supported by the supporting structure to be above the container so that the cover is adapted to containers of various sizes.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A purifying device, comprising:
   a container, having a containing space, wherein the containing space is adapted to contain a liquid;
   at least one cover, adapted to be connected to the container to cover the containing space;
   a sensing assembly, disposed on the cover, wherein the sensing assembly is adapted to sense a usage state of the cover;
   an ultraviolet source, disposed on the cover and adapted to generate an ultraviolet emitted to outside of the cover, wherein the ultraviolet source is turned on or turned off according to the usage state of the cover; and
   a liquid filtering assembly, wherein the container has an open end and a close end opposite to each other, the cover is adapted to be connected to the open end to cover the containing space, the liquid filtering assembly is detachably disposed at the close end, and when the cover is separated from the open end, the liquid filtering assembly is adapted to be detachably disposed at the open end.

2. The purifying device according to claim 1, comprising a control unit, wherein the control unit is coupled to the sensing assembly and the ultraviolet source, when the sensing assembly senses that the usage state of the cover is a covering state, the control unit controls the ultraviolet source to be turned on.

3. The purifying device according to claim 2, wherein the control unit is a control board and disposed on the cover.

4. The purifying device according to claim 3, wherein an outer side of the cover has an activating button, and the activating button is connected to the control board.

5. The purifying device according to claim 1, wherein the sensing assembly is a light sensing element, when the cover is covered on the container such that intensity of a light entering the cover from the outside of the cover is smaller han a threshold value, the usage state of the cover is a covering state, and when the cover is separated from the container such that the intensity of the light entering the cover from the outside of the cover is greater than or equal to the threshold value, the usage state of the cover is a non-covering state.

6. The purifying device according to claim 1, wherein a material of the container comprises a conductive material.

7. The purifying device according to claim 1, wherein the liquid filtering assembly comprises a filter cartridge and a liquid guiding element, when the liquid filtering assembly is disposed at the close end, the liquid guiding element sunounds the filter cartridge, and when the liquid filtering assembly is disposed at the open end, the liquid guiding element is adapted to move upward relative to the filter cartridge.

8. The purifying device according to claim 1, comprising an appearance element, wherein the appearance element is detachably disposed at the close end and accommodates the liquid filtering assembly.

9. The purifying device according to claim 8, comprising a connector, wherein the connector is detachably connected to the close end, and the appearance element is detachably connected to the connector.

10. The purifying device according to claim 1, wherein the ultraviolet source is a far-ultraviolet source.

11. The purifying device according to claim 1, wherein a material of an inner wall of the container comprises stainless steel.

12. The purifying device according to claim 1, wherein the sensing assembly comprises two conductive probes, when the cover is covered on the container such that the two conductive probes are in contact with the container and electrically connected to each other via the container, the usage state of the cover is a covering state, and when the cover is separated from the container such that the two conductive probes are not in contact with the container, the usage state of the cover is a non-covering state.

13. The purifying device according to claim 1, wherein the cover comprises an outer cover and an inner cover, and the inner cover is detachably disposed on the container.

14. The purifying device according to claim 13, wherein the ultraviolet source is disposed on the inner cover, and the outer cover is adapted to cover the inner cover.

15. The purifying device according to claim 13, wherein the sensing assembly comprises two electrodes and a conductive structure, the two electrodes are disposed on the inner cover, the conductive structure is disposed on the outer cover, when the outer cover covers the inner cover such that the conductive structure is connected to the two electrodes, the usage state of the cover is a covering state, and when the outer cover is separated from the inner cover such that the conductive structure is not connected to the two electrodes, the usage state of the cover is a non-covering state.

* * * * *